May 17, 1932.  E. MEEK  1,859,001
TRACTOR HITCH
Filed Sept. 15, 1930  2 Sheets-Sheet 1

INVENTOR.
Earl Meek
BY Lancaster, Allwine and Rommel
ATTORNEYS.

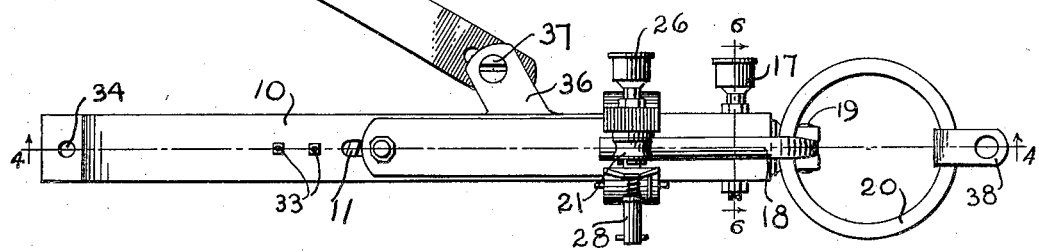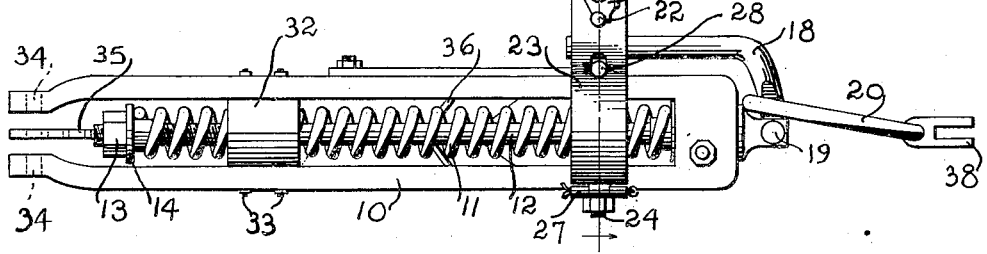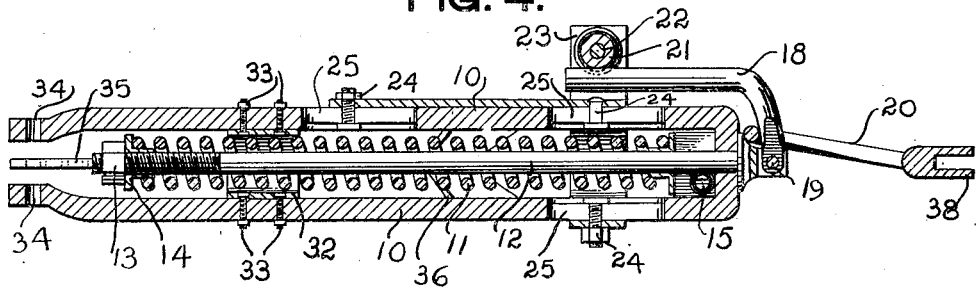

UNITED STATES PATENT OFFICE

EARL MEEK, OF BONETRAILL, NORTH DAKOTA

TRACTOR HITCH

Application filed September 15, 1930. Serial No. 482,089.

This invention relates to overload release couplings, and particularly to those designed for connecting tractors to agricultural implements so that if any obstruction is encountered as the implement is being drawn over the ground no injury will result to either the implement or to the tractor.

An object of this invention is to provide an improved overload release coupling which will not easily wear out and which will, during its entire life, be positive in operation. Another object is to provide a coupling which may be simply and inexpensively constructed so as to provide an extremely sturdy piece of mechanism. Other objects may later become apparent.

In the accompanying drawings:

Figure 2 is a top plan view of the coupling as it appears by itself.

Figure 3 is a side view thereof.

Figure 4 is a vertical longitudinal cross section of Figure 3.

Similar numerals refer to similar parts throughout the several views.

Figure 1:
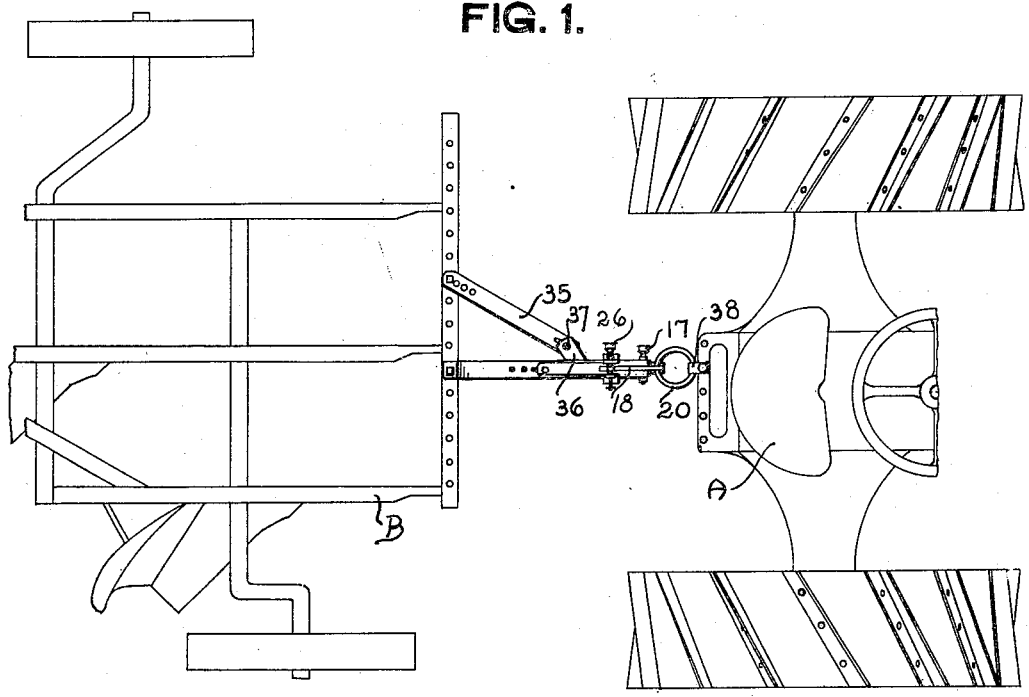
Figure 1 is a top plan view of a tractor connected to a farm implement by an overload release coupling constructed in accordance with this invention.
Figure 5:
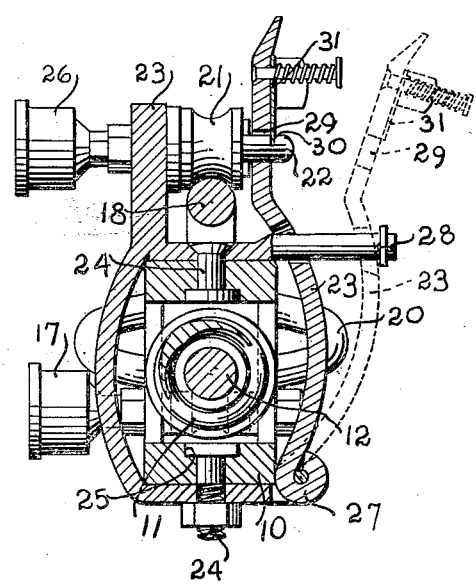
Figure 5 is an enlarged cross section taken on the line 5—5 of Figure 3.
Figure 6:
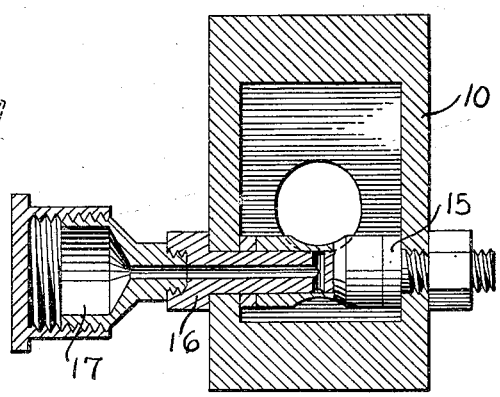
Figure 6 is an enlarged cross section taken on the line 6—6 of Figure 2.

As shown by the drawings the invention comprises a frame 10, within which a compression spring 11 is positioned with one end butting against the inside right hand end of the frame 10. A rod or draw bar 12 is positioned within this compression spring 11 with one of its ends connected with the free end thereof, the rod having this end threaded so that a nut 13 may be screwed down upon a washer element 14 to form the connection. The free end of the rod 12 projects through an aperture in the frame's end, an anti-friction element in the form of a roller 15 being provided to guide this end of the rod and to prevent rapid wear. Preferably this roller 15 is mounted on a drilled axle element 16 having a grease cup 17 connected thereto to force grease to the inner bearing surface of the roller to thus assure easy rotation of same.

A bent lever 18 is swingingly connected to the free end of the rod 12 by means of a pivot joint 19, a ring link member 20 being connected to the frame 10 through this swinging lever. This swinging lever is ordinarily held down by a roller 21 carried on an axle 22 which is positioned by a bracket 23 and is slidingly connected to the frame 10 by means of bolts 24 which engage in slots 25 formed in the upper and lower parts of the frame. Preferably the axle 22 also is drilled so that a grease cup 26 may be connected thereto to lubricate in the manner indicated in conjunction with the roller 15. An arm 23' forming one side of the bracket 23 is provided with a hinge 27, so that this arm may be swung outwardly to permit the sidewise engagement of the lever 18 beneath the roller 21 by slight rotation of the rod 12. A rod element 28 is supplied to position the arm 23' when swung outwardly, an aperture 29 being formed in the arm so that the axle 22 may project therethrough when the arm is swung towards the roller.

In order to retain this arm 23' in the closed position the axle 22 is provided with an indent 30, within which a spring pressed latch member 31 carried by this arm may engage.

A short cylindrical member 32 is fixed to the frame 10 by bolts and nuts 33 for the purpose of positioning the free end of the spring 11. The frame 10 is formed with apertures 34 for connection to farm implements, and a short steadying arm 35 which may also be connected thereto. This arm 35 is connected with the frame 10 through a short stub arm 36 by a bolt 37. The link 20 is preferably formed with a small apertured end 38 for connection to a tractor.

In operation, the coupling is connected between a tractor A and a farm implement B by means of a bolt passed through the aperture 34 in the end of the coupling steadying arm 35, and link 20, as shown by Figure 1. As the tractor draws the implement over the ground, the spring 11 will function to prevent any undue shocks or vibration being transmitted between the two. The anti-friction elements which guide the free end of the rod 12 and position the lever 18 will allow free play of this spring as well as preventing undue wear. Should the farm implement encounter an obstruction, or meet any other condition which will cause too much strain to be imposed upon either it or the tractor, the spring 11 will be compressed to such an extent as to permit disengagement of the lever 18 from beneath the roller 21 allowing it to swing up and about its pivot 19 so as to release the link 20 and thus disconnect the tractor from the implement before damage results to either. To re-connect the link 20 to the frame 10, it is inserted over the lever 18, which may then be reengaged beneath the roller 21.

In order to do this easily, the spring latch 31 is disengaged from the indent 30, permitting the movable side to swing about its hinge 27 so that the lever 18 may be swung down and beneath the roller 21, the rod 12 rotating slightly within the frame 10, and compression spring 11 to permit this motion. Upon engagement, the side of the bracket may be swung back and the catch 31 operated to again retain it in closed position. To meet varying conditions which demand varying amounts of power to be transmitted by the tractor, the bracket 23 may be slid back and forth upon the frame 10 by loosening the bolts and nuts 24 from the slots 25, and when the bracket 23 is properly positioned, these nuts and bolts may be re-tightened to retain it in this place.

An overload release coupling constructed and used in the manner described will assure absolute safety in the use of tractor drawn farm implements. As is well known, the damage not only may result to the implements or tractor, but the driver of the tractor may himself be seriously injured when using a defective coupling which does not properly release, due to the fact that some tractors have sufficient power to rotate about their rear wheels when the implement being drawn meets an immovable obstruction, thus causing the tractor to upset backwards upon the operator. The coupling described provides one whose moving parts are all constructed to prevent rapid wear, which incidently enables them to function extremely smoothly and with a high degree of certainty.

It is desired that it be understood that the appended claims are not to be limited to the specific form, herein shown and described, but are to be construed broadly.

I claim:

1. An overload release coupling including a frame, a compression spring carried by said frame and having one end contacting therewith, a rod slidably carried by the frame, positioned through said compression spring and having one end connected to the free end of the latter, a lever swingingly connected to the free end of said rod, and a roller structure including an axle having its one end portion carried by said frame, and an arm movably carried by the frame supporting the other end of said axle and movable to permit side-wise positioning of said lever beneath said roller.

2. An overload release coupling including a frame, a compression spring carried by said frame and having one end contacting therewith, a rod positioned through said spring and having one end connected to the free end thereof, a lever swingingly connected to the free end of said rod, a two sided open ended bracket slidingly mounted on said frame, an axle carried by said bracket at its open end and said bracket having one side mounted so as to swing away from and towards said axle, and a roller carried by said axle, said lever being positionable beneath said roller.

3. An overload release coupling including a frame having an apertured end and an elongate side extending from said end, a compression spring arranged parallel the side of said frame with one end contacting the apertured end thereof, a rod extending through the length of said spring and through and beyond the apertured end of said frame said rod having its end proximate the free end of said spring in connection therewith, a lever swingingly connected to the free end of said rod, an apertured arm swingably carried by the frame, a guide carried by the frame for limiting the swing of said arm, an axle carried by said frame, a roller on said axle, and means carried by said arm and axle for locking said arm to said axle, said swingable arm permitting sidewise positioning of said lever beneath said roller.

4. In an overload release coupling, the combination of a frame having an apertured end and an elongate side extending from said end, a compression spring paralleling said side with one end of said spring abutting the end of said frame, a guide roller carried by the end of said frame and a draw bar attached to the free end of said spring, extending over said roller and thru the apertured end of said frame, said roller being positioned to prevent said draw bar from contacting with the sides of said aperture and the convolutions of said spring.

EARL MEEK.